US008452858B2

(12) United States Patent
Wu et al.

(10) Patent No.: US 8,452,858 B2
(45) Date of Patent: May 28, 2013

(54) METHOD AND APPARATUS FOR LOADING LANDING PAGE

(75) Inventors: John Wu, San Diego, CA (US); Matthew Carlisle, Sammamish, WA (US); Slim Souissi, San Diego, CA (US); Seung Kim, San Diego, CA (US); Gwan Hee You, San Diego, CA (US)

(73) Assignee: Novatel Wireless, Inc., San Diego, CA (US)

( * ) Notice: Subject to any disclaimer, the term of this patent is extended or adjusted under 35 U.S.C. 154(b) by 0 days.

(21) Appl. No.: 13/465,967

(22) Filed: May 7, 2012

(65) Prior Publication Data

US 2012/0221685 A1    Aug. 30, 2012

Related U.S. Application Data

(63) Continuation-in-part of application No. 12/509,311, filed on Jul. 24, 2009.

(60) Provisional application No. 61/528,759, filed on Aug. 29, 2011, provisional application No. 61/178,926, filed on May 15, 2009, provisional application No. 61/181,645, filed on May 27, 2009.

(51) Int. Cl.
*G06F 15/177* (2006.01)

(52) U.S. Cl.
USPC .......................................................... 709/220

(58) Field of Classification Search
USPC ... 709/219, 220, 221; 370/331, 338; 455/410, 455/411, 418
See application file for complete search history.

(56) References Cited

U.S. PATENT DOCUMENTS

| 6,012,088 | A  | * | 1/2000  | Li et al. .......................... 709/219 |
|-----------|----|----|---------|-------------------------------------------|
| 7,565,529 | B2 | * | 7/2009  | Beck et al. ..................... 713/156  |
| 2002/0004935 | A1 | * | 1/2002 | Huotari et al. .................. 717/11  |
| 2004/0215479 | A1 |   | 10/2004 | Dorsey |
| 2004/0225752 | A1 |   | 11/2004 | O'Neil |
| 2005/0015772 | A1 |   | 1/2005  | Saare |
| 2005/0026636 | A1 | * | 2/2005 | Yoon ............................. 455/466 |

(Continued)

FOREIGN PATENT DOCUMENTS

| EP | 1457892 A1 | 9/2004 |
| WO | WO 2006031159 A1 | 3/2006 |

OTHER PUBLICATIONS

Matoba, Akihisa, "Interconnecting Multi-Vendor Multi-Hop WLAN and Internet via Hotspot", Advanced Communication Technology, 11th International Conference, Piscataway, NJ, pp. 1403-1405, Feb. 15, 2009.

(Continued)

*Primary Examiner* — Lashonda Jacobs
(74) *Attorney, Agent, or Firm* — AlbertDhand LLP

(57) ABSTRACT

A Universal Serial Bus (USB) modem/Wireless Wide Area Network (WWAN) device is provided that when connected to a host device, presents itself as an Ethernet endpoint to the host device, without requiring additional software/drivers to be downloaded to the host device. Embedded in the USB modem/WWAN device are various modules that provide functionality allowing either automatic connection to the Internet or redirection to a local Web User Interface (UI) that a user may employ to configure the USB modem/WWAN device and/or manually connect to the Internet. Additionally, the USB modem/WWAN device employs predetermined rules to determine whether or not/how the redirection occurs, including in scenarios where wireless connectivity to the Internet is unavailable.

20 Claims, 5 Drawing Sheets

U.S. PATENT DOCUMENTS

| | | |
|---|---|---|
| 2005/0050352 A1* | 3/2005 | Narayanaswami et al. ... 713/201 |
| 2005/0055374 A1 | 3/2005 | Sato |
| 2005/0177750 A1 | 8/2005 | Gasparini |
| 2005/0265323 A1* | 12/2005 | Thermond .................... 370/356 |
| 2006/0046712 A1 | 3/2006 | Shamp |
| 2006/0047830 A1* | 3/2006 | Nair et al. .................... 709/229 |
| 2006/0114883 A1 | 6/2006 | Mehta |
| 2006/0239254 A1 | 10/2006 | Short |
| 2007/0121651 A1 | 5/2007 | Casey |
| 2008/0008125 A1* | 1/2008 | Pham et al. ................... 370/329 |
| 2008/0172476 A1* | 7/2008 | Daniel et al. ................. 709/220 |
| 2009/0077637 A1 | 3/2009 | Santos et al. |
| 2009/0158148 A1* | 6/2009 | Vellanki et al. ............... 715/700 |
| 2009/0187659 A1 | 7/2009 | Savoure |
| 2009/0187678 A1* | 7/2009 | Itoh et al. ........................ 710/20 |
| 2010/0064063 A1* | 3/2010 | Deforche et al. .................. 710/5 |
| 2010/0132042 A1* | 5/2010 | Zhang ............................. 726/24 |
| 2011/0093922 A1* | 4/2011 | Crosswy et al. .................. 726/3 |
| 2011/0173682 A1 | 7/2011 | Perry |

OTHER PUBLICATIONS

European Search Report for EP Application 10162990.5, Nov. 24, 2010.

\* cited by examiner

METHOD AND APPARATUS FOR LOADING LANDING PAGE

CROSS-REFERENCE TO RELATED PATENT APPLICATIONS

This application claims priority under 35 U.S.C. §119(e) to U.S. Provisional Patent Application Ser. No. 61/528,759, filed Aug. 29, 2011, and is a Continuation-in-Part of U.S. patent application Ser. No. 12/509,311, filed Jul. 24, 2009, which in turn claims priority under 35 U.S.C. §119(3) to U.S. Provisional Patent Application Ser. No. 61/178,926, filed May 15, 2009 and U.S. Provisional Patent Application Ser. No. 61/181,645, filed May 27, 2009, all of which are incorporated herein by reference in their entirety for all purposes.

TECHNICAL FIELD

The present invention relates generally to the field of wireless communication and, more particularly to loading of configuration pages for user devices.

BACKGROUND

When using Universal Serial Bus (USB) modems/Wireless Wide Area Network (WWAN) or other modems, a user must typically install both driver software and application software on a host device, e.g., laptop, that is to use the USB modem. This provides a burden to the user and restricts their use of the modem on computers where they neither want, nor are able, to install such software. In addition, the requirement for host computer software adds an additional burden in terms of the cost structure for purchasing USB modem solutions. Finally, host computer software needs to run on multiple operating systems and therefore needs to be modified and compiled for each target operating system. Additionally, because laptop-resident software controls the device and the connection, the "auto connect" feature is slow when coming back from a lowered power state such as hibernate, suspend, or off.

Furthermore, WWAN networks are one of the only places where a device, such as a laptop using the USB modem, is allocated a public Internet Protocol (IP) address, although this is becoming less common especially in Europe. Every other network that a computer typically connects to is a private network with a private IP address. This had led to a weaker security posture for most laptops, as well as to security measures driven by protection via a network address translation (NAT) router rather than security on the laptop/computer itself. Therefore, being given a public IP address is arguably a dangerous practice for devices connecting to WWAN networks.

SUMMARY

Various aspects of examples of the invention are set out in the claims. According to a first aspect of the present invention, a method, comprises: presenting a universal serial bus (USB) modem to a host device as an Ethernet endpoint without installing USB modem application software on the host device; issuing the host device an Internet Protocol (IP) address; upon determining the USB modem is configured to automatically connect to the Internet, automatically connecting to the Internet; and upon determining the USB modem is not configured to automatically connect to the Internet, redirecting a hypertext protocol (HTTP) request from the host device to a Web user interface (UI).

According to a second aspect of the present invention, a computer-readable memory includes computer executable instructions, the computer executable instructions, which when executed by a processor, cause a USB modem to perform at least the following: present an Ethernet endpoint to a host device without installing USB modem application software on the host device; issue the host device an Internet Protocol (IP) address; upon a determination that the USB modem is configured to automatically connect to the Internet, automatically connect to the Internet; and upon a determination that the USB modem is not configured to automatically connect to the Internet, redirect a hypertext protocol (HTTP) request from the host device to a Web user interface (UI).

According to a third aspect of the present invention, an apparatus comprises at least one processor and at least one memory. The at least one memory includes computer program code, the at least one memory and the computer program code configured to, with the at least one processor, cause the apparatus to perform at least the following: present an Ethernet endpoint to a host device without installing apparatus application software on the host device; issue the host device an Internet Protocol (IP) address; upon a determination that the apparatus is configured to automatically connect to the Internet, automatically connect to the Internet; and upon a determination that the apparatus is not configured to automatically connect to the Internet, redirect a hypertext protocol (HTTP) request from the host device to a Web user interface (UI).

BRIEF DESCRIPTION OF THE DRAWINGS

For a more complete understanding of example embodiments of the present invention, reference is now made to the following descriptions taken in connection with the accompanying drawings in which.

DETAILED DESCRIPTION

In accordance with various embodiments, at least a connection manager and router are embedded into a USB modem/WWAN device, where no additional software/drivers from the USB modem/WWAN device need to be installed on a host device to which the USB modem/WWAN device is connected. A user is able to configure and control the USB modem/WWAN device via a USB modem/WWAN device-resident Web site. Additionally, a private IP address and firewall features are provided, giving the user a safer networking experience.

Such an embedded connection manager would also allow a user to initiate a network connection more quickly. Whenever a host device is ready and awake, the host device can receive a Dynamic Host Configuration Protocol (DHCP)-allocated IP address that will allow quicker connection to a network, such as the Internet. Also, the established security practice of NAT routers on USB product lines could be emulated. An embedded Web user interface (UI) (provided via the modem-resident Web site) is also desirable as running a local router allows additional services to be embedded on the local network like a Web server.

Figure 1:
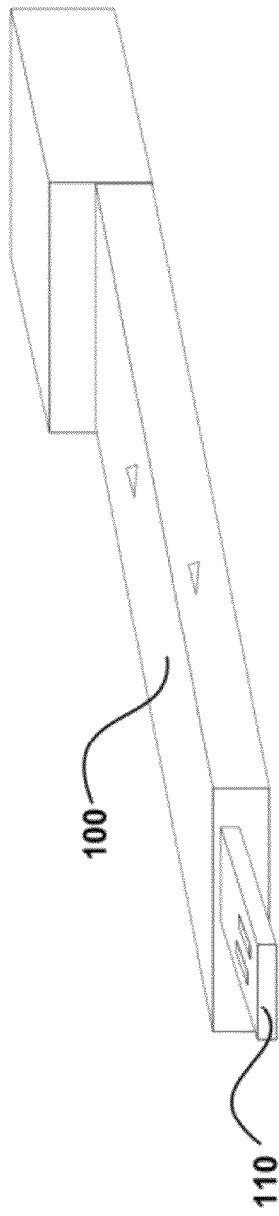
FIG. 1 is an exemplary USB modem/WWAN device.

To achieve the above-noted features, a USB modem may present itself to a host device, such as a laptop computer, as an Ethernet endpoint that would require no software drivers to be installed. FIG. 1 illustrates such as exemplary USB modem/WWAN device 100 with a USB connector/interface 110. An Ethernet endpoint refers to a particular type of network endpoint, such as, e.g., a computer, cable modem, etc., which has one or more Ethernet ports/cards implemented therein. The Ethernet endpoint may utilize a particular protocol for exchanging Ethernet-framed data between a device and a host. An Ethernet endpoint may have a globally-assigned identifier referred to as an Ethernet Address or Media Access Control (MAC) Address.

In accordance with one aspect of the present invention, the USB modem may present itself to the host device as a USB communications device class (CDC) Ethernet Network Control Model (ECM) type endpoint (CDC-ECM). A CDC-ECM endpoint presents itself as a virtual network interface controller (NIC) with an assigned MAC and IP address. In accordance with another aspect, the USB modem/Ethernet endpoint may present itself as an RMNet Ethernet endpoint, which refers to a proprietary USB virtual Ethernet framework alternative to the CDC-ECM that was developed by Qualcomm® for mobile computing platforms. It should be noted that the USB modem could present itself as another type of endpoint in accordance with other embodiments contemplated herein.

Upon connection to a host device, the USB modem would present the correct USB Ethernet endpoint to the host device operating system in an attempt to present the correct class of device that does not necessitate the installation of a modem driver/application software. As a fallback, a CDC-ECM standard endpoint may be presented to the host device, and an auto-install CD-ROM mass storage device could be presented that would contain drivers to be installed.

Figure 2:
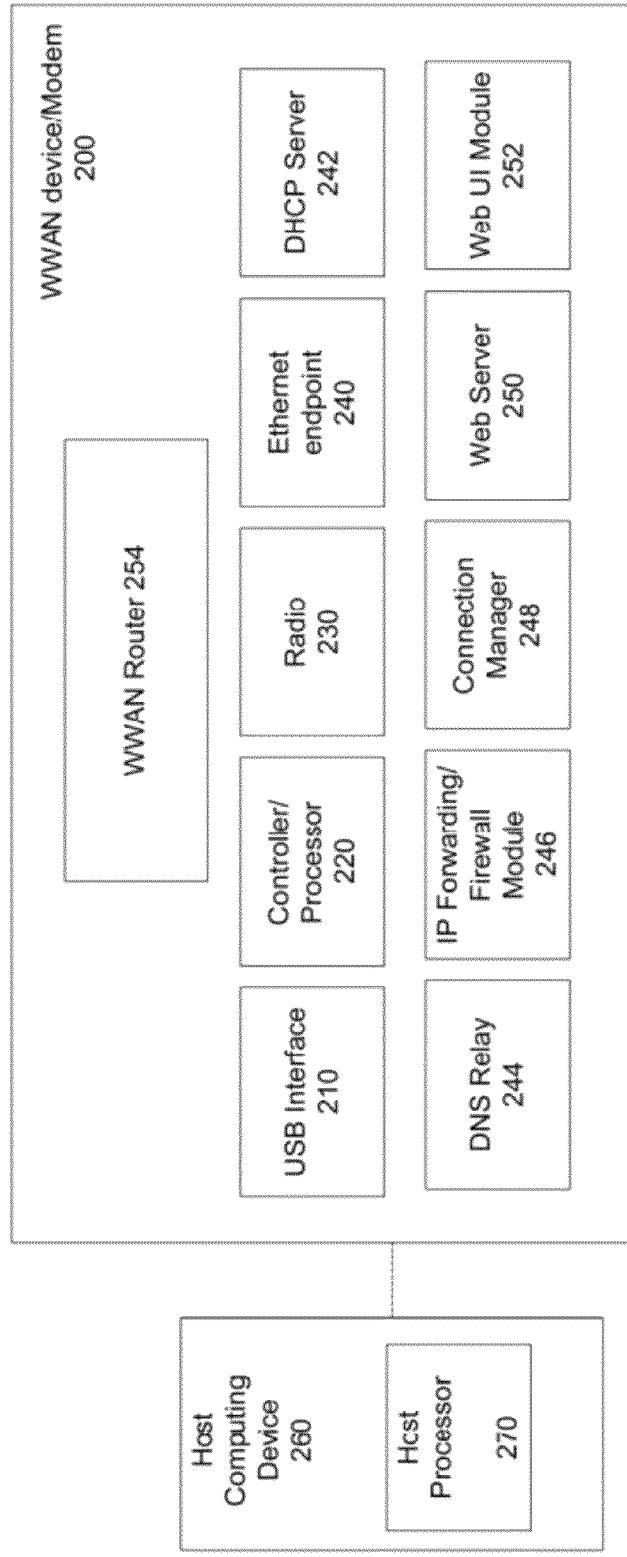
FIG. 2 is a schematic representation of the USB modem/WWAN device of FIG. 1 in accordance with an embodiment of the present invention.

FIG. 2 illustrates an exemplary schematic representation of a USB modem/WWAN device 200 in accordance with various embodiments, as well as a host computing device 260 (operating with at least one host processor 270) to which the USB modem 200 may be connected. As further illustrated in FIG. 2, and in addition to USB modem modules, i.e., USB interface 210, controller/processor 220, and radio 230, various additional components/modules may be embedded into the USB modem 200 including, but not limited to the following elements. An Ethernet endpoint 240 for the host computing device 260, as described previously, could be of, e.g., the RMNet or CDC-ECM-type, and may perform auto-configuration according the host computing device environment in order to limit or completely remove the need for driver software to be installed. A DHCP Server 242 may also be embedded into the USB model/WWAN device 200, where the USB modem 200 can allocate a private IP address to the host computing device 260 from its internally configured pool of IP addresses.

Furthermore, and to the above, the USB modem/WWAN device 200 may have embedded therein a domain name system (DNS) Relay 244 allowing the USB modem 200 to assign the host computing device 260 a DNS server equivalent to the IP address of the USB modem itself. That is, the DNS Relay 244 plays the role of a DNS server that sends requests to the ISP DNS server (or whatever is specified in the WWAN settings) and caches any received information for later access. In the context of the present invention, the USB modem 200 may forward requests to the modem's assigned DNS server on the WWAN network, while supporting DNS "Friendly names" so that a Web user interface (UI) for the USB modem 200 is more easily accessible.

Additionally still, the USB modem 200 may include an IP Forwarding and Firewall module 246, which allows the USB modem 200 to act as a NAT gateway and stateful packet inspection (SPI) firewall, with the potential to add port forwarding and port filtering for mobile hot spot implementations. It should be noted that via the IP Forwarding and Firewall module 246, VPN pass-through connectivity may also be supported. A Connection Manager 248 may also be embedded in the USB modem 200 to support the configuration of network parameters (e.g., APNs, auto-connect, etc.) by a user, through the Web UI, thus allowing the USB modem/WWAN device 200 to be capable of connecting to a network (e.g., a WWAN network) in an autonomous fashion. A Web Server 250 may also be embedded in the USB modem 200. For example, a standards-compliant web server may be hosted in the USB modem 200, which would allow a user to configure the USB modem, view network status, and initiate connections with a desired network. A Web UI Module 252, for implementing the aforementioned Web UI may also be embedded in the USB modem 200, where, e.g., all files necessary for the Web UI may reside on a flash or other memory unit (not shown) of the USB modem 200.

It should be noted that a device implementing the desired features contemplated herein may include a WWAN device, such as a WWAN USB modem or other laptop-tethered single user interface, with modified Web-router firmware capable of supporting these features. As such, and as illustrated in FIG. 2, the USB modem/WWAN device 200 may further include a WWAN Router 254.

As described above, and via, e.g., the embedded modules/functionality, a USB modem configured in accordance with various embodiments of the present invention acts as a DHCP Server, DNS Relay, and Internet gateway. The USB modem is able to route all traffic to the Internet via an embedded router (e.g., a WWAN router) on the USB modem itself. If no connection to the WWAN network were present, the USB modem may automatically redirect a user's HTTP queries to a modem-hosted Web site hosting a Web UI which could provide the user the ability to activate a network connection, control the network connection, and manage the settings of the USB modem/WWAN device. In fact, the user can choose to go to the USB modem-hosted Web site at any time the USB modem is inserted into a host computing device by navigating, via a host computing device web browser, to the IP address of the USB modem router (for example, 192.168.1.1) or a DNS friendly name of the USB modem as assigned in the provisioning instructions. It should be noted that not all of the aforementioned modules/functions are necessarily present in each embodiment of the present application, but may be modified/altered as desired to achieve the desired functionality of the USB modem/WWAN device.

Figure 3:
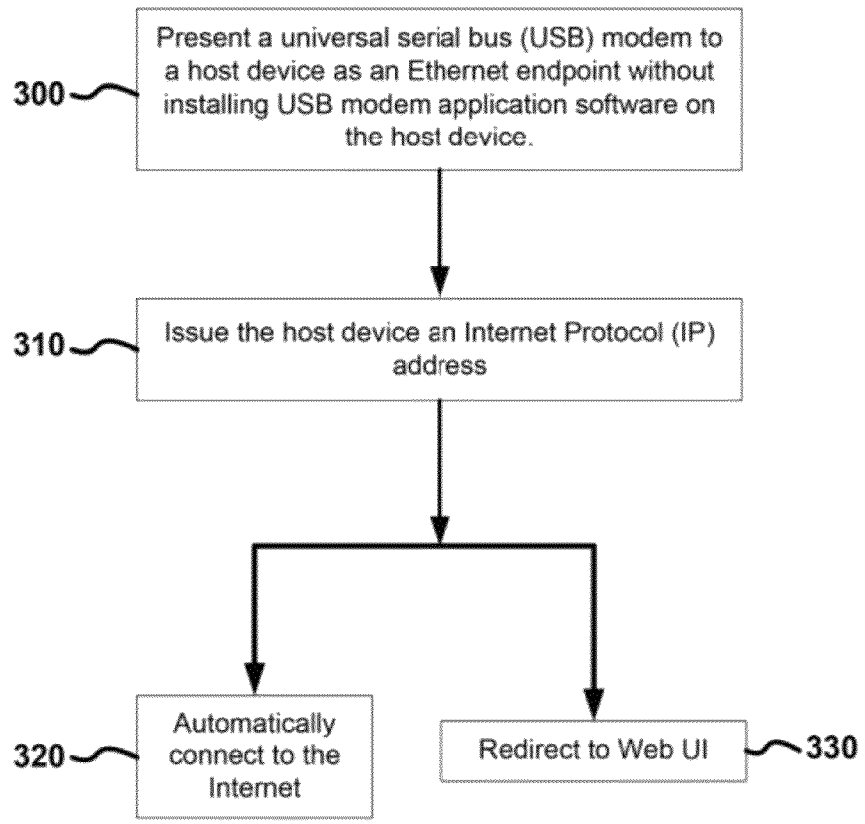
FIG. 3 is a flow chart illustrating exemplary processes performed to avoid driver/additional software installation of a USB modem/WWAN device in accordance with various embodiments.

FIG. 3 is a flow chart illustrating exemplary processes performed to avoid driver/additional software installation of a USB modem/WWAN device in accordance with various embodiments. Considering a typical user experience, the user may insert a USB modem/WWAN device into a host computing device, such as a laptop computer. At 300, the USB modem is presented to the host device as an Ethernet endpoint, without installing USB modem application software/drivers on the host device. Thus, the host device itself may install drivers automatically without additional software required from the modem. At 310, the host device is issued an IP address. The IP address may be issued from a DHCP server embedded in the USB modem. If the USB modem is configured to automatically connect to a network, at 320, the USB does so, and automatically connects to, e.g., the Internet. If the USB modem is not configured to automatically connect, redirection to a Web UI is performed at 330. That is, a user's HTTP queries from, e.g., a Web browser, are redirected to a embedded Web UI where the user can manually connect to a desired network, or otherwise configure the USB modem/WWAN device.

As described previously, various embodiments of the present invention perform redirection to a Web UI for, e.g., manual configuration of/activation of a network connection. It is often desirable for a user connecting to the Internet through a modem, router or mobile hot spot, to be directed to a configuration page to allow for such configuration/activation. Wireless service providers also desire to provide specific content on a configuration page and to direct users to such a configuration page when, e.g., users initially launch their Web browser. An exemplary WAN router may use 3G wireless communication for backhaul and WiFi for local area wireless connectivity.

A router, mobile hot spot, or other device can use an internal web server to serve up router configuration pages as previously described. Currently, a DNS relay is usually applied regardless of the client that is requesting service. For example, in many hotels, when a user opens a Web browser, that user is redirected to a signup Web page. Once registered, the user is not redirected to that signup Web page again. However, this does not allow for use case scenarios where it is desirable to redirect a user to some type of "home" page every time there is a new connectivity session, such as a WiFi session.

Additionally, there are scenarios as well, where redirection is not desirable, such as if a client request is not an actual "browser" request. Moreover, many conventional routers do not even employ a redirect function. Instead, a user is required to type in a router address in order to get to a configuration home page. Further still, the existence of a DNS relay, when there is no established network (.e.g., Internet) connection, can pose an added problem. That is, through the use of the DNS relay, a Web browser will cache a redirected IP address, thus preventing access to the "correct" URL when a connection is established. This is not a problem on a typical hotel router because an Internet connection, for example, will have already been established, but may be less desirable in other circumstances.

Hence, and to the above, a desired redirect does not necessarily entail a mere straightforward DNS relay operation. For example, it is undesirable to block traffic from other WiFi-enabled clients that may also be using the services of a router or mobile hot spot. In accordance with one embodiment of the present invention, a rule-based approach is applied to browser redirection so that a proper decision may be made in determining whether an HTTP request redirection should be allowed in response to a client request.

Accordingly, one or more rules including, but not limited to the following rules described herein, may be applied in accordance with various embodiments. A first rule may entail the DNS Relay determining whether a client request includes the string "www.*" in order to effectuate a redirect. A second rule may involve the use of a user agent to determine that a Web browser is in use (e.g., the HTTP request must have a user agent that matches one of a list of configured regular expressions of a browser) before effectuating a redirect (for example, certain ActiveX controls may utilize a Web browser for an HTTP request). A third rule may entail limiting a DNS relay to only HTTP requests, while HTTP-secure requests are not relayed. Still other rules may involve detecting/determining whether an application is making an HTTPS request prior to a user launching a Web browser so that such HTTPS requests can be allowed to pass through without relay/redirect, and only relaying/redirecting subsequent Web browser requests based on, e.g., one or more of the previously-described redirect rules. Still other rules may include requiring that the HTTP request is "port 80" destined, requiring that the HTTP request is an HTTP Get request, as opposed to an HTTP Post, and/or allowing only a certain number of redirections per WiFi associate, e.g., once for each "use." It should be noted that application of the above rules may be effectuated using, e.g., a Boolean function "AND'ed" with at least one of the aforementioned rules.

Figure 4:
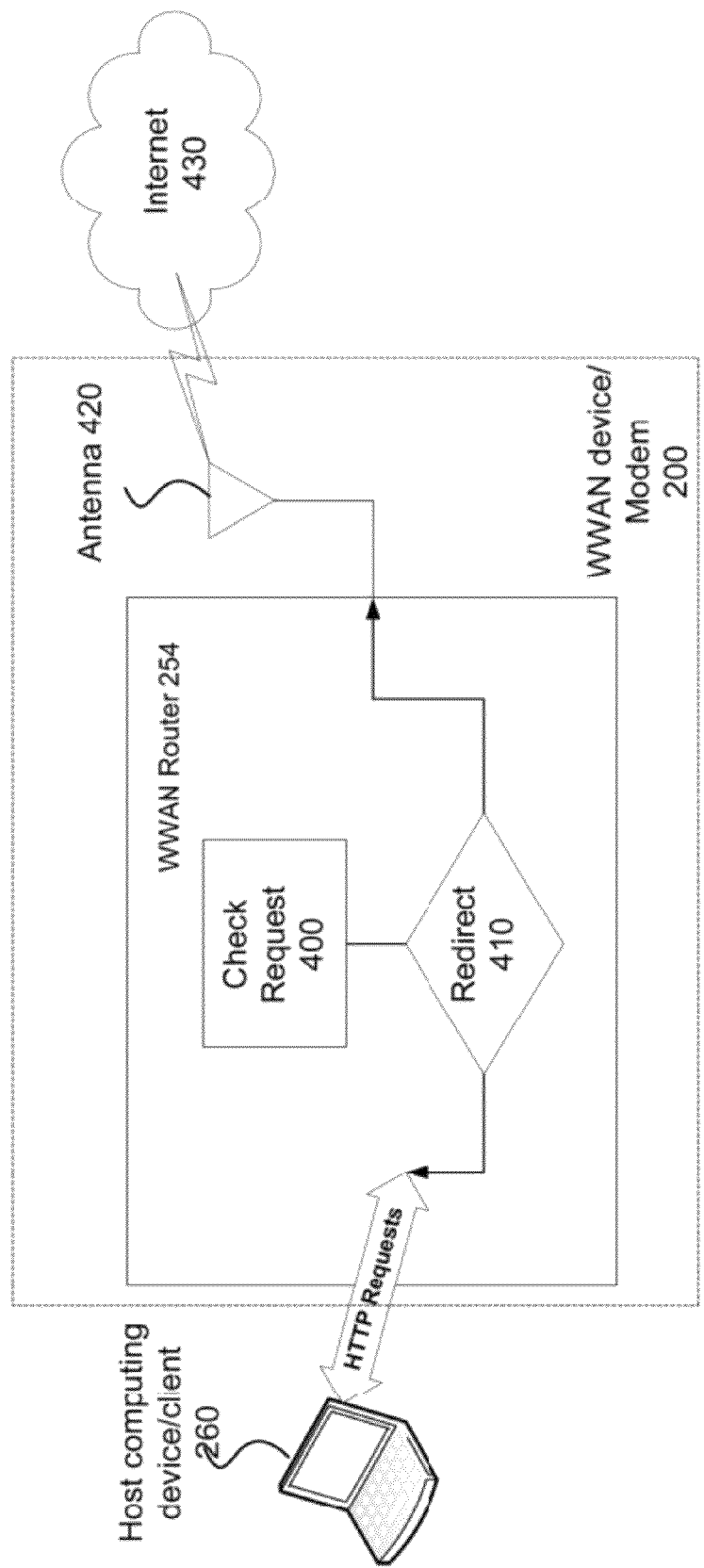
FIG. 4 is a flow chart of exemplary processes performed to achieve HTTP request redirection in accordance with various embodiments.

FIG. 4 is a flow chart of exemplary processes performed to achieve HTTP request redirection in accordance with various embodiments. At 400, a service request, e.g., HTTP request, received at a WWAN Router 254 from a host computing device/client 260 is checked. For example, and in accordance with one embodiment described above, rules may be applied such that redirection is applied only if proper/warranted based on one or more of such rules. If redirection is proper, at 410, redirection is applied and the client is redirected to the WWAN device/modem 200 itself so that, e.g., a configuration or landing page (as disclosed, for example, in co-pending U.S. patent application Ser. No. 12/509,311) may be presented. If redirection is not warranted, however, the HTTP request is allowed to go through to, e.g., the Internet 430, via an antenna 420 of the WWAN device/modem 200.

As previously alluded to, various embodiments contemplate the use of a mobile hot spot, such as a Novatel Wireless MiFi® mobile hot spot. Such a mobile hotspot may be configured to use a 3G wireless network for backhaul purposes (e.g., getting data from a user to a major network node/network backbone or network data transmission over alternative wireless route), and WiFi for local area wireless connectivity. In accordance with one embodiment, a mobile hot spot is configured to address scenarios where a redirected IP address is cached (when Internet connectivity cannot be established) and subsequently directs a client to that redirected address even when Internet connectivity becomes available.

Figure 5:
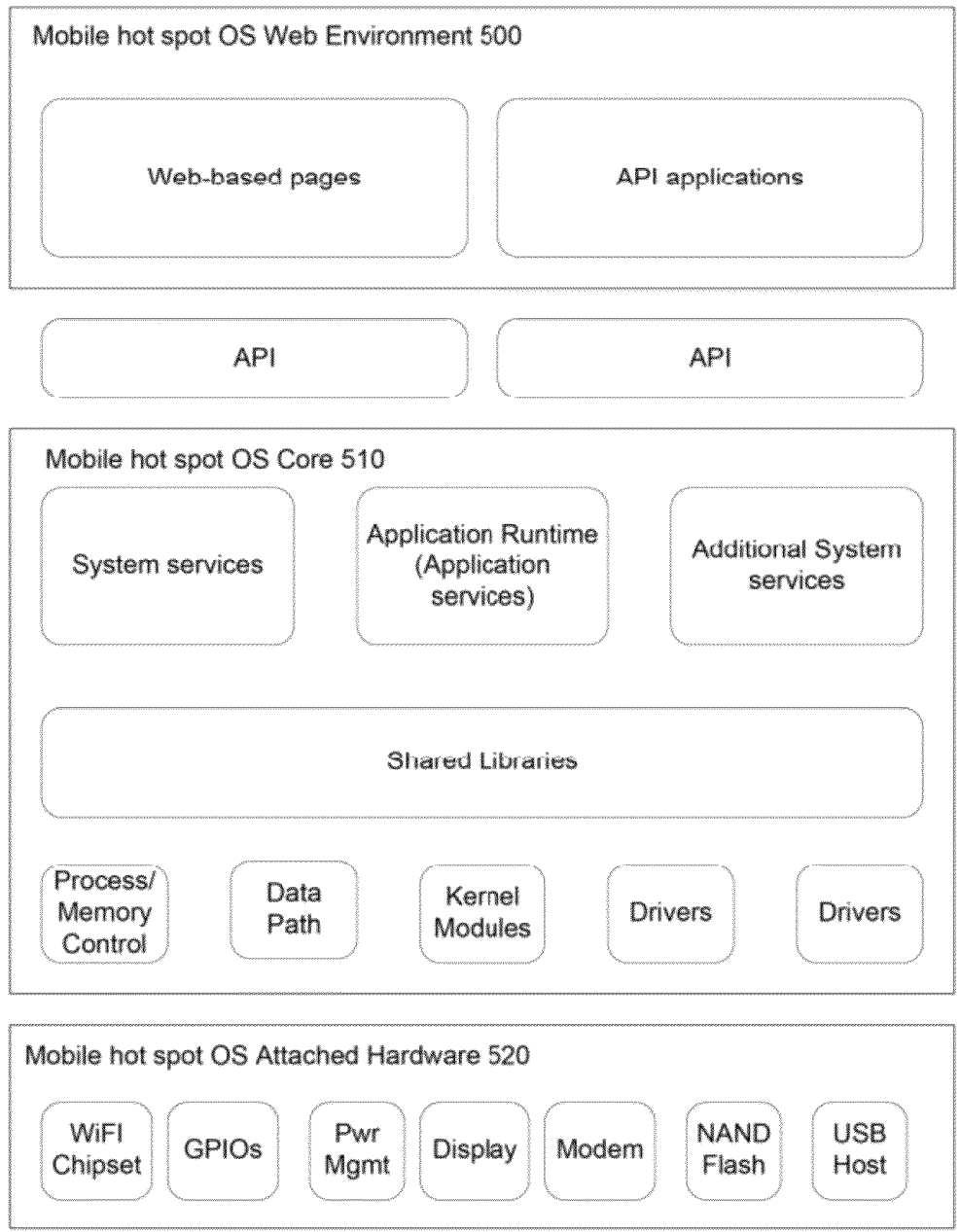
FIG. 5 is a representation of a mobile hot spot device architecture utilized in accordance with various embodiments.

FIG. 5 illustrates an exemplary schematic representation of a mobile hotspot device architecture utilized in accordance with various embodiments of the present invention. A Mifi OS Web Environment 500 includes web-based pages and API applications which are implemented by the MiFi OS Core 510 via, one or more APIs, such as wireless APIs. The MifiOS Core 410 itself may include system services, application runtime for various application services, and additional system services modules/components. Additionally, shared libraries, process/memory control, data path, kernel modules, and drivers, may also make up the MiFi OS Core 510. Lastly, MiFi OS Attached Hardware 520 may include one or more of the following: a WiFi chipset, general purpose input/outputs (GPIOs); power management, display, modem, memory unit (s) (e.g., NAND flash); and USB host modules.

Figure 6:
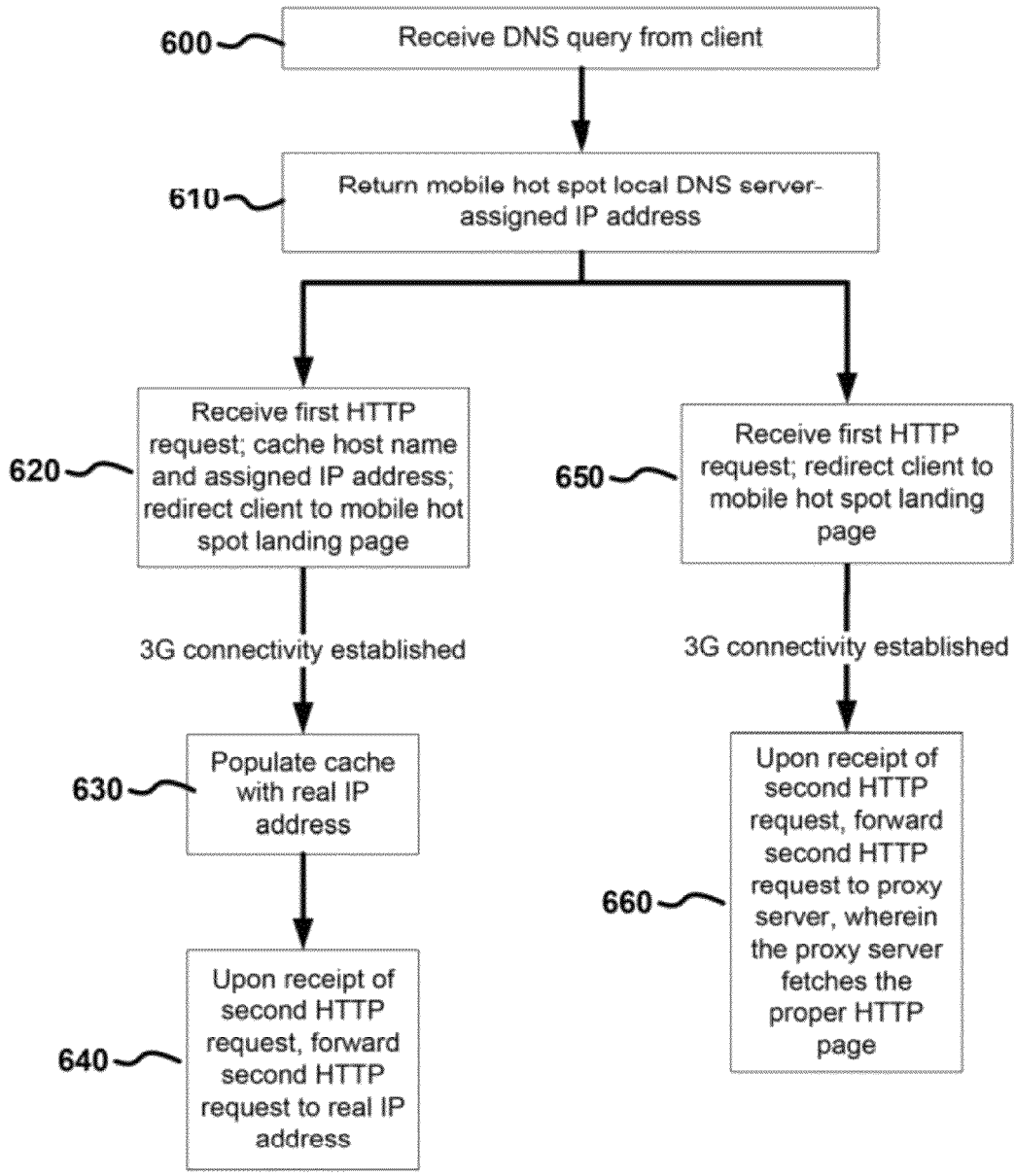
FIG. 6 is a flow chart illustrating exemplary processes performed for properly handling HTTP redirection when network connectivity is not available in accordance with various embodiments.

To provide the correct/real address in such a scenario, a "Real IP" may be obtained for cached DNS names by making a data call. FIG. 6 is a flow chart exemplary processes performed in accordance with one embodiment for handling redirection when there is no network, e.g., the Internet, connectivity. Accordingly, when 3G connectivity is down and the mobile hot spot receives DNS queries from a client, at 600 the mobile hot spot "local DNS server" (an IP address of the mobile hot spot itself) can return an IP address in a DNS response for each of the queries at 610. For example, if the local DNS server/mobile hot spot has an IP address of 192.168.1.1, then an IP address in the range of, e.g., 192.168.3.2 . . . 192.168.3.254 may be returned. Thereafter, and when a first HTTP request is received, the host name (URL) and the IP address (previously assigned as described above) is cached in a DNS cache table maintained by the mobile hot spot, and the request can be redirected to the desired landing page (for example that corresponding to the IP address 192.168.1.1) using HTTP 301 redirection at 620. It should be noted that as described previously, redirection may be handled in accordance with one or more predetermined rules prior to redirecting those requests, where the rules are based on, e.g., information that is obtained from/associated with the client making such requests and/or based on certain content within the requests.

When 3G connectivity becomes available, and after a 3G connection is established, the DNS cache table of the mobile hot spot can be filled with "Real IP" addresses at 630. Accordingly, DNS queries are sent to the remote DNS server (e.g., ISP DNS server) and DNS replies are received. The DNS cache table thus contains the host name (URL), the local IP address, and the remote IP address associated with each DNS query received from the client. When an HTTP request is received for IP addresses assigned while 3G connectivity was down (e.g., 192.168.3.2 . . . 192.168.3.254) then NAT (modifying IP address information in IP packet headers while in transit across, e.g., a router) is modified in such a way that the HTTP request is forwarded to the Real IP (using the mobile hot spot DNS cache table) at 640.

Alternatively, and in accordance with another embodiment, an HTTP proxy may be utilized as also illustrated in FIG. 6. It should be noted that if an HTTP proxy is used, code for the previously-described embodiment may be disabled through the use of a flag. Again, when 3G communication is down, and when the mobile hot spot receives DNS queries from a client at 600, the mobile hot spot local DNS server returns IP address in the DNS response to each of the queries (in the 192.168.3.2 . . . 192.168.3.254 range of IP addresses) at 610. When a first HTTP request is received, the request can be redirected to a mobile hot spot landing page (e.g., that associated with the 192.168.1.1 IP address) at 6500 using, e.g., HTTP 301 redirection. Again, it should be noted that redirection may be handled in accordance with one or more predetermined rules prior to redirecting those requests, where the rules are based on, e.g., information that is obtained from/ associated with the client making such requests and/or based on certain content within the requests. When 3G connectivity becomes available, and when a second HTTP request is received, NAT is modified to send all requests to a proxy server, and the proxy server can handle fetching the proper HTTP pages for the client based on the host name in the HTTP header at 660.

In this manner, a device, method, system and computer code product can be configured that provides a way for a 3G network operator to direct browser traffic to their, e.g., home page, but still allow other, non-browser applications to access the Internet. Moreover, such systems and methods, when provided as a feature on, e.g., a WWAN modem/device, enable wireless service providers to brand the mobile Internet experience.

While various embodiments of the present invention have been described above in the context of a WWAN device that can be, e.g., a WiFi-based router or a USB modem that, e.g., handles Ethernet over USB, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Moreover, various embodiments described herein are described in the general context of method steps or processes, which may be implemented in one embodiment by a computer program product, embodied in a computer-readable memory, including computer-executable instructions, such as program code, executed by computers in networked environments. A computer-readable memory may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. Various embodiments may comprise a computer-readable medium including computer executable instructions which, when executed by a processor, cause an apparatus to perform the methods and processes described herein.

Furthermore, embodiments of the present invention may be implemented in software, hardware, application logic or a combination of software, hardware and application logic. The software, application logic and/or hardware may reside on a client device, a server or a network component. If desired, part of the software, application logic and/or hardware may reside on a client device, part of the software, application logic and/or hardware may reside on a server, and part of the software, application logic and/or hardware may reside on a network component. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. In one embodiment, the computer-readable storage medium is a non-transitory storage medium.

What is claimed is:

1. A method, comprising:
   presenting a universal serial bus (USB) modem to a host device as an Ethernet endpoint without installing USB modem application software on the host device, wherein the presenting is performed by the USB modem itself;
   issuing to the host device, from the USB modem, an Internet Protocol (IP) address;
   automatically connecting to the Internet when the USB modem determines that it is configured to automatically connect to the Internet; and
   redirecting a hypertext protocol (HTTP) request from the host device to a Web user interface (UI) when the USB modem determines that it is not configured to automatically connect to the Internet.

2. The method of claim 1, wherein the IP address comprises a private IP address, and wherein the private IP address is issued via a Dynamic Host Configuration Protocol (DHCP) server resident on the USB modem.

3. The method of claim 1, wherein the Web UI is hosted on a Web server resident on the USB modem, and wherein the Web UI provides for manual connection to the Internet or configuration of the USB modem.

4. The method of claim 1, wherein the Ethernet endpoint comprises one of an RMNet Ethernet endpoint or a communications device class (CDC) Ethernet Network Control Model (ECM) Ethernet endpoint.

5. The method of claim 1, further comprising applying at least one predetermined rule prior to the redirecting to determine whether the redirecting should occur.

6. The method of claim 1, wherein the redirecting is effectuated via a domain name system (DNS) relay resident on the USB modem.

7. The method of claim 1 further comprising, bypassing the redirection upon determining that the HTTP request is non-Web browser related.

8. The method of claim 2 further comprising, when connectivity to the Internet via a wireless carrier network is unavailable, performing at least the following:
   receiving a DNS query from the host device;
   assigning the host device a local DNS server-assigned IP address instead of the private IP address issued by the DHCP server;
   caching a host device name and the DNS server-assigned IP address, and performing the redirecting to the Web UI, wherein the Web UI comprises a landing page; and
   upon establishment of the connectivity to the wireless carrier network, further performing at least the following:
      further caching a real IP address associated with the HTTP request; and
      upon receipt of a second HTTP request from the host device, forwarding the second HTTP request to the real IP address.

9. The method of claim 2 further comprising, when connectivity to the Internet via a wireless carrier network is unavailable, performing at least the following:
   receiving a DNS query from the host device;
   assigning the host device a local DNS server-assigned IP address instead of the private IP address issued by the DHCP server;
   performing the redirecting to the Web UI, wherein the Web UI comprises a landing page; and
   upon establishment of the connectivity to the wireless carrier network, and upon receipt of a second HTTP request, forwarding the second HTTP request to a proxy server, wherein the proxy server fetches a proper HTTP page.

10. The method of claim 1, wherein the USB modem comprises, in part, a Wireless Wide Area Network (WWAN) router configured to route traffic to the Internet.

11. A computer-readable memory including computer executable instructions, the computer executable instructions, which when executed by a processor, cause an apparatus to perform a method as claimed in claim 1.

12. An apparatus, comprising:
   at least one processor; and
   at least one memory including computer program code, the at least one memory and the computer program code configured to, with the at least one processor, cause the apparatus to perform at least the following:

presentan Ethernet endpoint to a host device without installing apparatus application software on the host device;

issue the host device an Internet Protocol (IP) address;

upon a determination that the apparatus is configured to automatically connect to the Internet, automatically connect to the Internet; and upon a determination that the apparatus is not configured to automatically connect to the Internet, redirect a hypertext protocol (HTTP) request from the host device to a Web user interface (UI).

13. The apparatus of claim 12, wherein the IP address comprises a private IP address, and wherein the private IP address is issued via a Dynamic Host Configuration Protocol (DHCP) server resident on the apparatus.

14. The apparatus of claim 12, wherein the Web UI is hosted on a Web server resident on the apparatus, and wherein the Web UI provides for manual connection to the Internet or configuration of the apparatus.

15. The apparatus of claim 12, wherein the Ethernet endpoint comprises one of an RMNet Ethernet endpoint or a communications device class (CDC) Ethernet Network Control Model (ECM) Ethernet endpoint.

16. The apparatus of claim 12, wherein the computer program code is further configured to, with the at least one processor, cause the apparatus to apply at least one predetermined rule prior to the redirection to determine whether the redirection should occur.

17. The apparatus of claim 12, wherein the redirection is effectuated via a domain name system (DNS) relay resident on the apparatus.

18. The apparatus of claim 12 further comprising, bypassing the redirection upon determining that the HTTP request is non-Web browser related.

19. The apparatus of claim 13, wherein when connectivity to the Internet via a wireless carrier network is unavailable, the computer program code is further configured to, with the at least one processor, cause the apparatus to perform at least the following:

receive a DNS query from the host device;

assign the host device a local DNS server-assigned IP address instead of the private IP address issued by the DHCP server;

cache a host device name and the DNS server-assigned IP address, and performing the redirecting to the Web UI, wherein the Web UI comprises a landing page; and upon establishment of the connectivity to the wireless carrier network, the computer program code is further configured to, with the at least one processor, cause the apparatus to perform at least the following:

further cache a real IP address associated with the HTTP request; and upon receipt of a second HTTP request from the host device, forward the second HTTP request to the real IP address.

20. The apparatus of claim 13, wherein when connectivity to the Internet via a wireless carrier network is unavailable, the computer program code is further configured to, with the at least one processor, cause the apparatus to perform at least the following:

receive a DNS query from the host device;

assign the host device a local DNS server-assigned IP address instead of the private IP address issued by the DHCP server;

perform the redirection to the Web UI, wherein the Web UI comprises a landing page; and upon establishment of the connectivity to the wireless carrier network, and upon receipt of a second HTTP request, forward the second HTTP request to a proxy server, wherein the proxy server fetches a proper HTTP page.

* * * * *